(No Model.)
W. D. RINEHART & J. ALBERTSON.
Belt Tightener.
No. 229,841. Patented July 13, 1880.
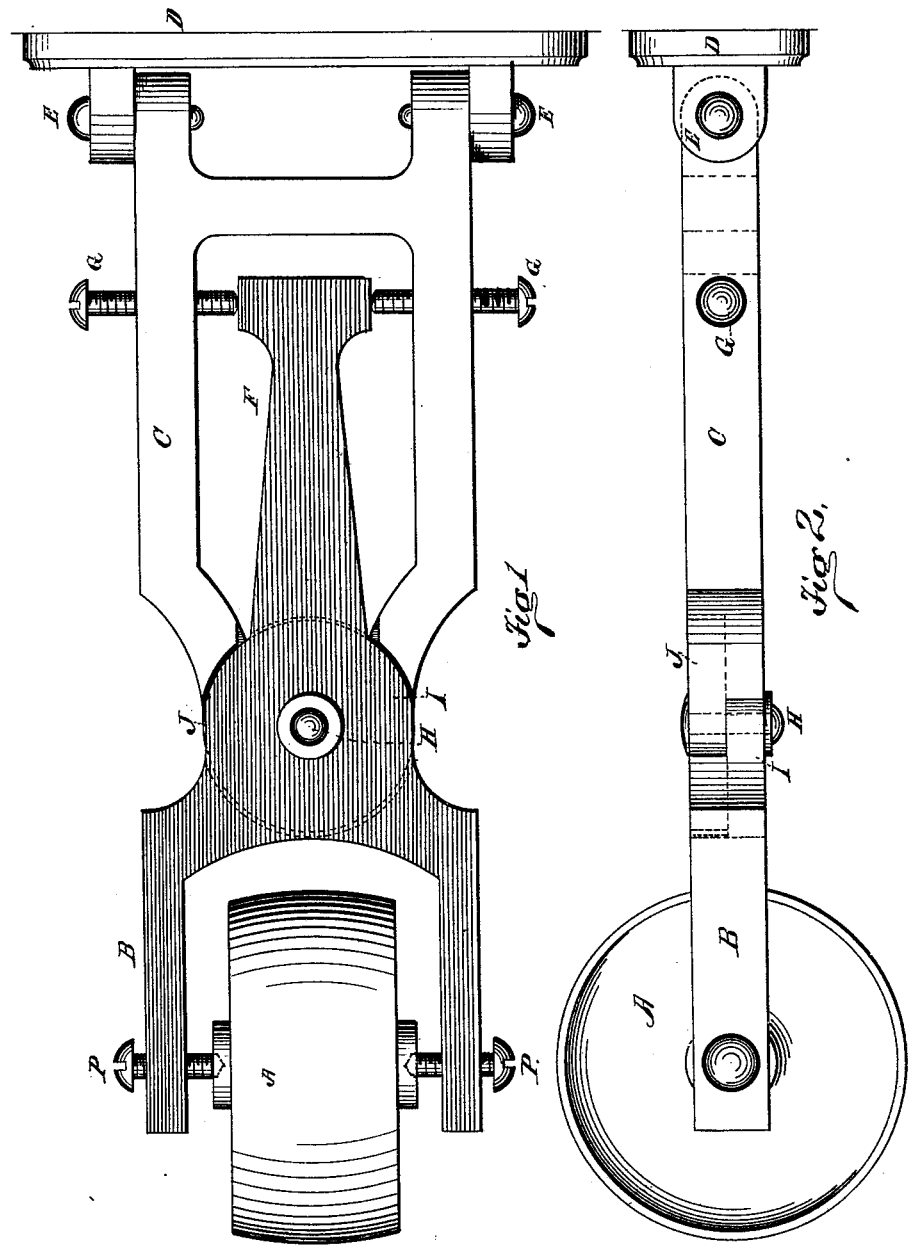
WITNESSES:
H. A. Gray.
Wm Hurst
INVENTORS
William D. Rinehart
James Albertson
by James W. See.
ATTORNEY

UNITED STATES PATENT OFFICE.

WILLIAM D. RINEHART AND JAMES ALBERTSON, OF RICHMOND, INDIANA.

BELT-TIGHTENER.

SPECIFICATION forming part of Letters Patent No. 229,841, dated July 13, 1880.

Application filed April 21, 1880. (No model.)

*To all whom it may concern:*

Be it known that we, WILLIAM D. RINEHART and JAMES ALBERTSON, of Richmond, Wayne county, Indiana, have invented certain new and useful Improvements in Belt-Tighteners, of which the following is a specification.

Our invention relates to intermediate pulleys placed in contact with belts to keep them tight and to act as a relieving device when the belt is to be thrown out of action.

The object of our invention is to provide a tightener which may be so adjusted as to neutralize the tendency of belts to sag edgewise and to leave their proper place upon their pulleys. This applies particularly to belts transmitting motion to or from vertical shafts. We also wish to provide means by which the effects due to errors in alignment in horizontal shafts may be neutralized.

In the accompanying drawings, Figure 1 is a side elevation, and Fig. 2 a plan, of our improved tightener as applied to a belt between vertical shafts. As applied to a belt between horizontal shafts, Fig. 1 would be a plan and Fig. 2 a side elevation.

It is well known to those familiar with the operation of belts that if two shafts are not in parallel alignment a belt from one to the other will tend to work off of one of the pulleys. This may be remedied by properly aligning the shafts, by giving excessive crownage to the pulleys, by placing unyielding guides at the edges of the belt, or by the use of our improved tightener, as hereinafter shown.

When belts are used to transmit motion between vertical shafts the tendency of the belt to work off is aggravated by the weight of the belt. This tendency in such belts must be met by throwing the shafts out of correct line, by guiding the edge of the belt, or by the use of our improved tightener.

The weight of a belt transmitting motion between vertical shafts does not tend to cause adhesion, as in belts between horizontal shafts. It becomes necessary to strain such belts by means of tighteners or intermediate pulleys pressed firmly against the belt. These tighteners are used for varying as well as for applying the strain.

The movement of the tightening-pulley toward the belt may be a sliding one or a swinging one. In the drawings we show our improvement as applied to a swinging tightener.

D is a fixed support, such as a post or wall. B C is a frame pivoted to D at E. The end of the frame opposite the pivots is caused to act as a housing to support the tightening-pulley A. The parts are to be so located that the pulley may be vibrated toward and away from the belt it operates upon.

The motion of the frame and the pressure of the pulley may be produced by means of screws, cams, levers, or cords placed so as to render the tightener capable of being operated from a distance, if desired.

As thus far described the device constitutes a plain swing-tightener, which can be used to vary the strain upon a belt.

The frame B C is provided with an adjustment by which the pulley can be moved in the plane of its axis. The housing part B of the frame is pivoted to the main part C at H. The relation of the parts can be adjusted by means of the screws G in an obvious manner.

Should a belt on vertical pulleys tend to fall and run down off the main pulleys the tendency can be rectified by raising the pulley A by means of the screws G. If the belt tends to rise, the pulley A is to be lowered.

The juncture of the housing-piece B and frame-piece C is arranged with broad disk-surfaces to give the structure firmness.

It will be readily understood that the longitudinal adjustment of the axis of the pulley A may be produced by moving the axle bodily in the housing—as, for instance, by an obvious manipulation of the screws P, whose ends serve as bearings for the pulley by acting as male centers or plugs, on which the pulley may run, or by arranging the housing to slide in the frame-piece. The adjustment is as applicable to a tightener in which the main or straining adjustment is in a straight line as to one in which the main motion is a swinging one.

The pivoting of the housing-piece B, as shown, tends to give the axis of the pulley A an oblique position, and this obliquity tends to enhance its corrective powers over the belt.

With a parallel adjusting motion the guiding of the belt is accomplished mainly by the new position given to the crowning of the tightening-pulley; but when the adjusting motion is an arcal one, as when the housing is pivoted to the frame-piece, the guiding is accomplished more by the oblique circumferential travel of the pulley than by the change in the position of the crown.

With a sliding adjustment a flat-faced pulley would guide very indifferently, while with an arcal adjustment a crowning face upon the guide-pulley is not at all essential.

We claim as our invention—

In a belt-tightening device, the combination, with a frame arranged to apply a straining-pressure upon the tightening-pulley and belt, of a lever pivoted to said frame, when one end of said lever forms a housing for the tightening-pulley and the other end is arranged to be acted upon by adjusting-screws, substantially in the manner as set forth.

WILLIAM D. RINEHART.
JAMES ALBERTSON.

Witnesses:
L. T. LEMON,
C. F. WALTERS.